Feb. 18, 1958     A. S. T. LAGAARD     2,823,921
STAIR CLIMBING HAND TRUCKS
Filed March 1, 1955

INVENTOR
ALEXANDER S. T. LAGAARD
*Caswell & Lagaard*
ATTORNEYS

United States Patent Office 2,823,921
Patented Feb. 18, 1958

2,823,921

STAIR CLIMBING HAND TRUCKS

Alexander S. T. Lagaard, Minneapolis, Minn., assignor to Albert T. O'Neil and Gunnar H. Danielson, Lake City, Minn., tenants in common Application March 1, 1955, Serial No. 491,289

4 Claims. (Cl. 280—5.2)

The herein disclosed invention relates to stair climbing hand trucks and has for an object to provide a hand truck which may be readily moved upstairs and which can be controlled in its movement downstairs to facilitate the handling of bulky articles on the truck.

An object of the invention resides in utilizing a frame carried by two supporting wheels and in constructing the frame with two longitudinal frame members terminating in handles and with the supporting wheels disposed outwardly of the frame members.

Another object of the invention resides in providing a brake drum attached to each of the wheels and with which suitable braking means is associated.

A still further object of the invention resides in providing ratchet wheels issuing outwardly from the brake drums and in providing levers having pawls connected to the wheels and engaging said ratchet wheels to procure propulsion of the wheels in a rearward direction.

An object of the invention resides in providing a shaft extending across the frame members and to which said levers are attached and in further providing an operating member connected to said shaft for turning the same and moving the pawls to cause rotation of the wheels.

Another object of the invention resides in constructing the brake means as an internal brake shoe engageable with the inner surface of the brake drum and in providing a shaft extending across said frame members and having cams on the ends of the same adapted to simultaneously operate both of said brake shoes to cause simultaneous braking of the wheels of the truck.

Other objects of the invention reside in the novel combination and arrangement of parts and in the details of construction hereinafter illustrated and/or described.

Figure 1:
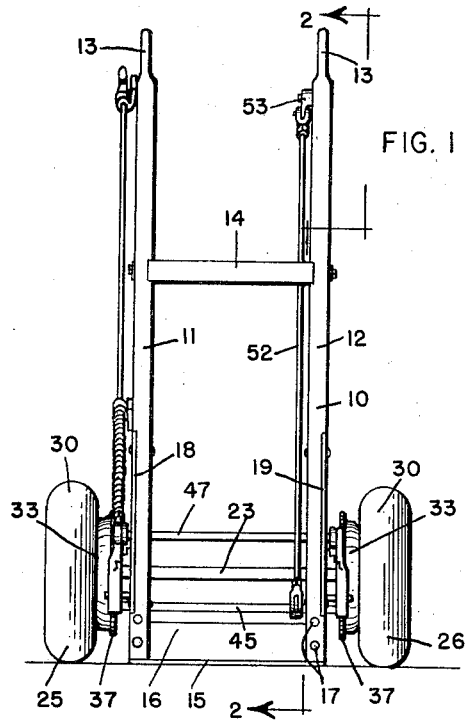
Fig. 1 is a front elevational view of a hand truck illustrating an embodiment of the invention.

The invention shown in the drawings consists of a frame utilizing two longitudinal frame members terminating in handles and having at their lower ends a rest on which the objects to be transported are disposed and a cross member connecting the frame members together intermediate their ends. The frame is supported on two supporting wheels freely rotatable on the ends of an axle supported by said longitudinal frame members. The wheels are disposed outwardly of said frame member and each wheel has attached to it a brake drum. Issuing outwardly from each drum is a flange formed with ratchet teeth and providing a ratchet wheel. Carried by the frame members is a shaft having two levers secured to the same, each lever having pivoted to it a pawl adapted to engage the teeth of one of said ratchet wheels. The pawls are normally moved out of engagement with the ratchet wheels by means of cams engaging the pawls. Internal brake bands are disposed within the brake drums and are adapted to be expanded to effect braking of the wheels. These brake bands are split and adapted to be spread apart by cams mounted on a shaft extending transversely of the frame and carried by the frame members. The said brake bands are anchored intermediate their ends by means of the shaft for operating said pawls. One of the levers for operating the pawls has attached to it a rod extending up towards the handles on the frame members and to which is attached a hand grip by means of which the pawls may be moved in a direction to rotate the wheels. Resilient means acting between this rod and one of the frame members urges the pawls in a manner to engage cams fixed relative to the frame and whereby the pawls are moved out of the path of movement of the ratchet wheels.

The invention comprises a frame 10 which consists of two longitudinal frame members 11 and 12. These frame members may be constructed of wood and are formed at their upper end with handles 13 by means of which the truck may be manipulated in the customary manner. These longitudinal frame members are secured together intermediate their ends by means of a cross bar 14. The lower ends of the longitudinal frame members 11 and 12 are connected to a rest 15 which has a flange 16 bent upwardly therefrom and secured to said frame members by means of rivets 17.

Figure 2:
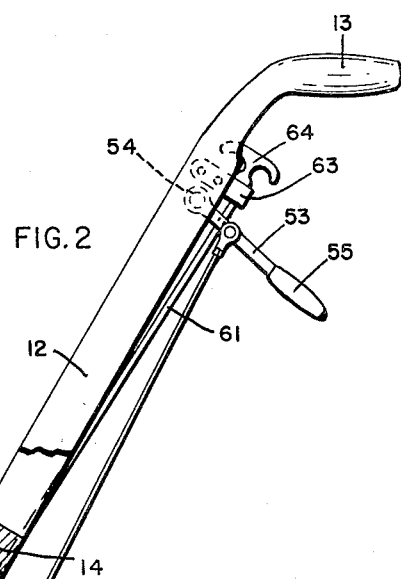
Fig. 2 is an elevational view of the structure shown in Fig. 1 taken on line 2—2 of Fig. 1 and drawn to a greater scale.
Figure 3:
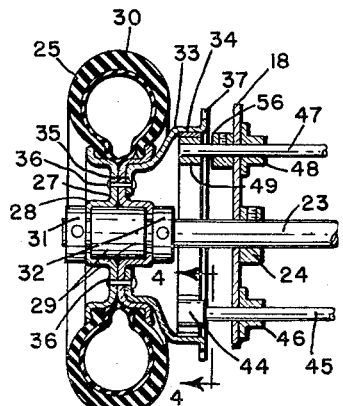
Fig. 3 is a fragmentary longitudinal sectional view taken on line 3—3 of Fig. 2 and drawn to the same scale as Fig. 2.

The frame 10 has attached to the lower portion of the same two plates 18 and 19, of which the plate 18 is shown in detail in Fig. 2. This plate extends rearwardly of the frame members and is attached to said frame members at their surfaces by means of rivets 21. These plates are formed with holes 22 in alignment with one another and which receive an axle 23. Axle 23 is held from endwise movement on these plates by means of collars 24 secured thereto and which butt against the facing surfaces of said plates. Mounted on the protruding ends of the axle 23 are rubber-tired wheels 25 and 26 which consist of tires 30 mounted on wheel centers 27. These wheel centers are each formed with a hub 28 in which is mounted ball bearings 29. The shaft 23 extends through the ball bearings 29 and the wheels are held from endwise movement on said axle by means of collars 31 and 32.

Attached to the wheel center 27 of each of the wheels 25 and 26 is a brake drum 33. This brake drum has a cylindrical portion 34 and a flange 35 extending inwardly therefrom and attached to the wheel center 27 by means of rivets 36. The said drum further has an outwardly extending flange 37 at the end of the cylindrical portion 34 thereof, remote from the tire, and which is formed with ratchet teeth 38. The flange 37 so constructed constitutes a ratchet wheel which is integral with the drum 33. Wheels 25 and 26 are spaced sufficienly from the frame members 11 and 12 to provide space for the portions 34 of hubs 33 as well as for the ratchet wheels 37 and the parts cooperating therewith.

Figure 4:
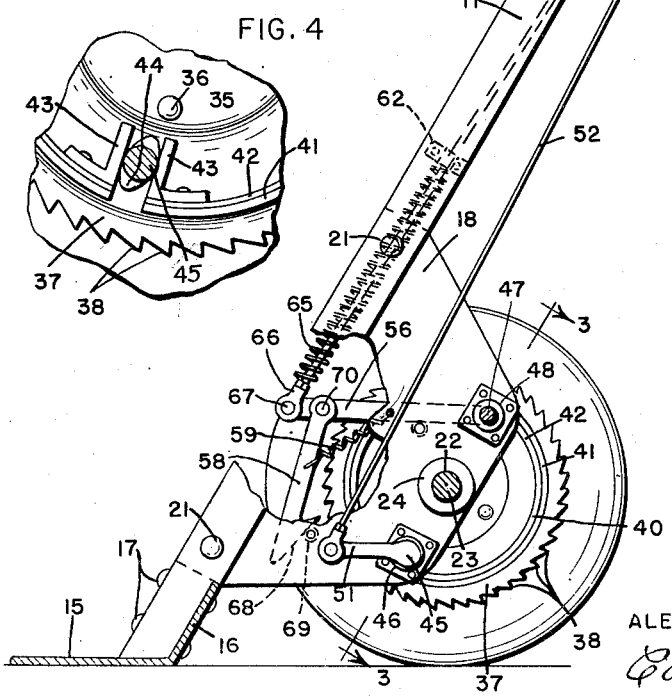
Fig. 4 is a fragmentary elevational sectional view taken on line 4—4 of Fig. 3 and drawn to a still greater scale.

Within the interior of each drum 33 is mounted a brake shoe 40 which includes a split band 42. This band has attached to the outer surface thereof a brake lining 41. At the ends of the said band, as best shown in Fig. 4, are mounted two cam followers 43 which are normally spaced from one another. Between these cam followers are positioned cams 44 which, upon rotation, are adapted to spread the followers 43 apart and to expand the band and cause the lining 41 to frictionally engage the cylindrical portion 34 of the drum 33. The cams 44 are mounted on a cam shaft 45 which extends across the frame 10 and is journaled in bearings 46 attached to the plates 18 and 19. The brake band 42 is held in position by means of a shaft 47 which extends across the frame 10 and is journaled in bearings 48 attached to the plates 18 and 19. The ends of this shaft extend into fittings 49 secured to the bands 42 intermediate their ends and which restrain rotation of the brake band with reference to the frame of the truck.

The shaft 45 may be turned by means of a lever 51 secured thereto. This lever is disposed adjacent the frame member 12 and has pivoted to it a rod 52 which extends along said frame member. This rod is pivoted at its upper end to a lever 53. Lever 53 is pivoted by means of a screw 54 to the inner side of the frame member 12 and has a hand piece 55 at the end of the same and by means of which said lever may be manipulated. Upon swinging of the lever 53 upwardly toward the handle 13, shaft 45 is rotated and correspondingly cams 44 are rotated and spread the cam followers 43 apart to urge the brake linings 41 into engagement with the drums 33.

For rotating the wheels 25 and 26 the ratchet wheels 37 are utilized. Mounted upon and secured to the shaft 47 are two levers 56. These levers have pivoted to them, by means of rivets 70, pawls 58 which are adapted to engage the teeth 38 of the ratchet wheels 37. Extending between said pawls and levers are tension coil springs 59 which urge the pawls toward the ratchet wheels. The lever 56 adjacent plate 18 has pivoted to it a rod 61 which extends along the frame member 11. This rod passes loosely through a guide 62 mounted on said frame member intermediate the ends thereof and also through a guide 63 on said frame member adjacent the handle 13. The end of the rod 61 has secured to it a hand grip 64 by means of which the rod may be pulled upwardly. Encircling said rod is a compression coil spring 65 which is seated at one end against the guide 62 and at its other end against a clevis 66 attached to the lower end of said rod. This clevis is pivoted by means of a rivet 67 to the outer end of the lever 56. It will readily be comprehended that the levers 56, being both connected to shaft 47, are urged in a downward direction by spring 65, and that the springs 59 urge the pawls 58 into engagement with the teeth 38 of the ratchet wheels.

The pawls 58 are formed with cam followers 68 adapted to be engaged by cams 69 secured to the plates 18 and 19. These cams and cam followers throw the pawls 58 out of engagement with the teeth 38 of the ratchet wheels 37 when the hand grip 64 is released. This grip engaging the guide 63 limits the movement of the pawls 58 to the position shown in Fig. 2.

The method of using the invention is as follows: In descending stairs or a steep ramp, the movement of the loaded truck is controlled by the brakes through the operation of the lever 53 while the truck is guided by the handles 13. In ascending the stairs, the hand grip 64 is pulled upwardly. The initial movement of the rod 61 to which it is attached, causes the cam followers 68 to follow along the cams 69 and to bring the pawls 58 into engagement with the teeth 38 of ratchet wheels 37. Further movement of the hand grip 64 causes the ratchet wheels 37 and the supporting wheel attached thereto to rotate in unison. This causes rearward movement of the truck and permits of the same being manually pulled up the stairs. As soon as the hand piece 64 is released, the follower 68 engages cam 69 and immediately throws the pawls 58 out of engagement with the ratchet wheels, permitting the truck to travel freely in the ordinary manner.

The advantages of the invention are manifest. The construction is symmetrical and the wheels are mounted equal distances from the frame so that the truck may be easily steered and manipulated when fully loaded. Since both the brakes and the propelling mechanism operate on both wheels, the pull or braking effect is uniform on both wheels. By arranging the brake drums on each side of the frame and attaching the same to the wheels, the cost of building the truck is greatly reduced, and the same parts can be used for both wheels.

Changes in the specific form of the invention, as herein described, may be made within the scope of what is claimed without departing from the spirit of the invention.

Having described the invention, what is claimed as new and desired to be protected by Letters Patent is:

1. In a stair climbing hand truck a frame, supporting wheels, one at each side of said frame rotatably mounted on said frame for independent rotation, a brake drum for each of said wheels, said drum having a cylindrical portion, a flange extending inwardly therefrom and disposed at the edge thereof adjacent said wheel and directly secured to the wheel, a second flange extending outwardly from said cylindrical portion and disposed at the opposite edge thereof, ratchet teeth on the outer periphery of said second flange and forming therewith a ratchet wheel, a shaft extending across said frame and rotatably mounted relative thereto, levers fast on said shaft at opposite ends thereof, pawls pivoted to said levers and engageable with said ratchet wheels, operating means connected to and serving to turn said shaft, brake shoes disposed within the cylindrical portions of said brake drums and engageable therewith and operating means for operating said brake shoes.

2. In a stair climbing hand truck a frame, supporting wheels, one at each side of said frame rotatably mounted on said frame for independent rotation, a brake drum for each of said wheels, said drum having a cylindrical portion, a flange extending inwardly therefrom and disposed at the edge thereof adjacent said wheel and directly secured to the wheel, a second flange extending outwardly from said cylindrical portion and disposed at the opposite edge thereof, ratchet teeth on the outer periphery of said second flange and forming therewith a ratchet wheel, a shaft extending across said frame and rotatably mounted relative thereto, levers fast on said shaft at opposite ends thereof, pawls pivoted to said levers and engageable with said ratchet wheels, operating means connected to and serving to turn said shaft, brake shoes disposed within the cylindrical portions of said brake drums and engageable therewith and operating means for operating said brake shoes, said shaft engaging said brake shoes and restraining rotation thereof.

3. In a stair climbing hand truck a frame, an axle extending across said frame at the lower end thereof and carried thereby, supporting wheels, one at each side of the frame and rotatably mounted on the ends of said axle for independent rotation, a shaft extending across said frame with its ends in proximity to said wheels, bearings carried by said frame and supporting said shaft for rotation, said shaft being disposed above said axle, a second shaft extending across said frame and having its ends disposed in proximity to said wheels, said second shaft being situated below said axle, brake drums connected to said wheels, and disposed adjacent thereto, ratchet wheels connected to said wheels and disposed adjacent thereto, levers mounted on said first named shaft and secured thereto, pawls pivoted to said levers and engageable with said ratchet wheels, brake shoes engageable with said brake drums, means on the ends of said second named shaft engaging said brake shoes and serving upon rotation of said second named shaft to bring said shoes into frictional engagement with said brake drums, operating means connected to said first named shaft and serving to rotate said wheels and operating means connected to said second named shaft and serving to retard rotation of said wheels.

4. In a stair climbing hand truck a frame, an axle extending across said frame at the lower end thereof and carried thereby, supporting wheels, one at each side of the frame and rotatably mounted on the ends of said axle for independent rotation, a shaft extending across said frame with its ends in proximity to said wheels, bearings carried by said frame and supporting said shaft for rotation, said shaft being disposed above said axle, a second shaft extending across said frame and having its ends disposed in proximity to said wheels, said second shaft being situated below said axle, brake drums attached to said wheels and concentrically disposed relative thereto, ratchet wheels issuing outwardly from said brake drums, levers mounted on said first named shaft and secured thereto, pawls pivoted to said levers and engageable with said ratchet wheels, brake shoes disposed within and engageable with said brake drums, means on the ends of said second named shaft engaging said brake shoes and serving upon rotation of said second named shaft to bring said shoes into frictional engagement with said brake drums, operating means connected to said first named shaft and serving to rotate said wheels and operating means connected to said second named shaft and serving to retard rotation of said wheels.

References Cited in the file of this patent

UNITED STATES PATENTS

| | | |
|---|---|---|
| 2,116,825 | Crescent et al. | May 10, 1938 |
| 2,633,363 | Marshall | Mar. 31, 1953 |
| 2,706,640 | Marshall | Apr. 19, 1955 |
| 2,733,074 | Fuglie et al. | Jan. 31, 1956 |

FOREIGN PATENTS

| | | |
|---|---|---|
| 187,291 | Germany | June 24, 1907 |
| 643,218 | Germany | Apr. 1, 1937 |